April 12, 1932.  R. S. TROTT  1,853,837
STONE CART
Filed June 13, 1930  2 Sheets-Sheet 2
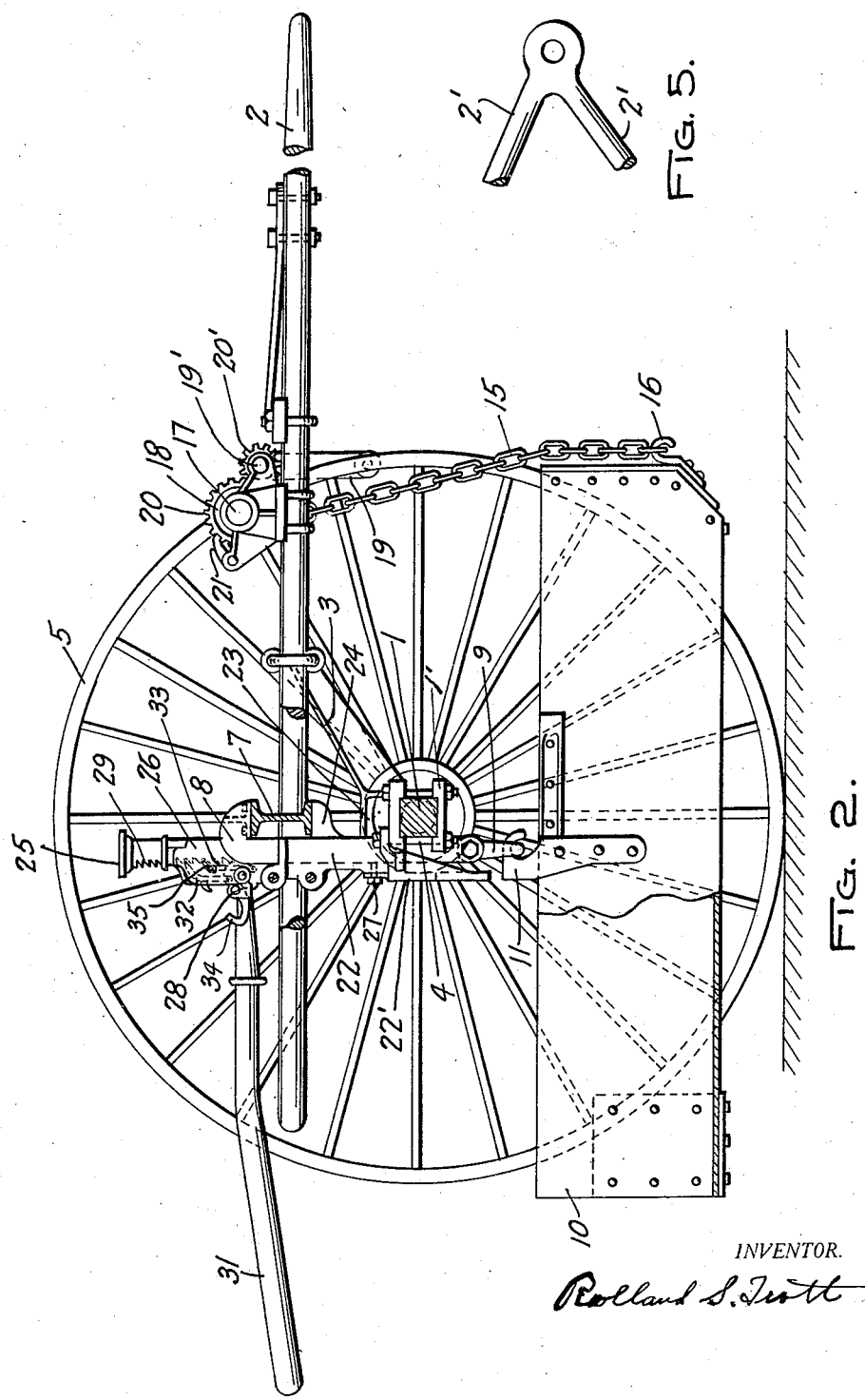
INVENTOR.
Rolland S. Trott Patented Apr. 12, 1932

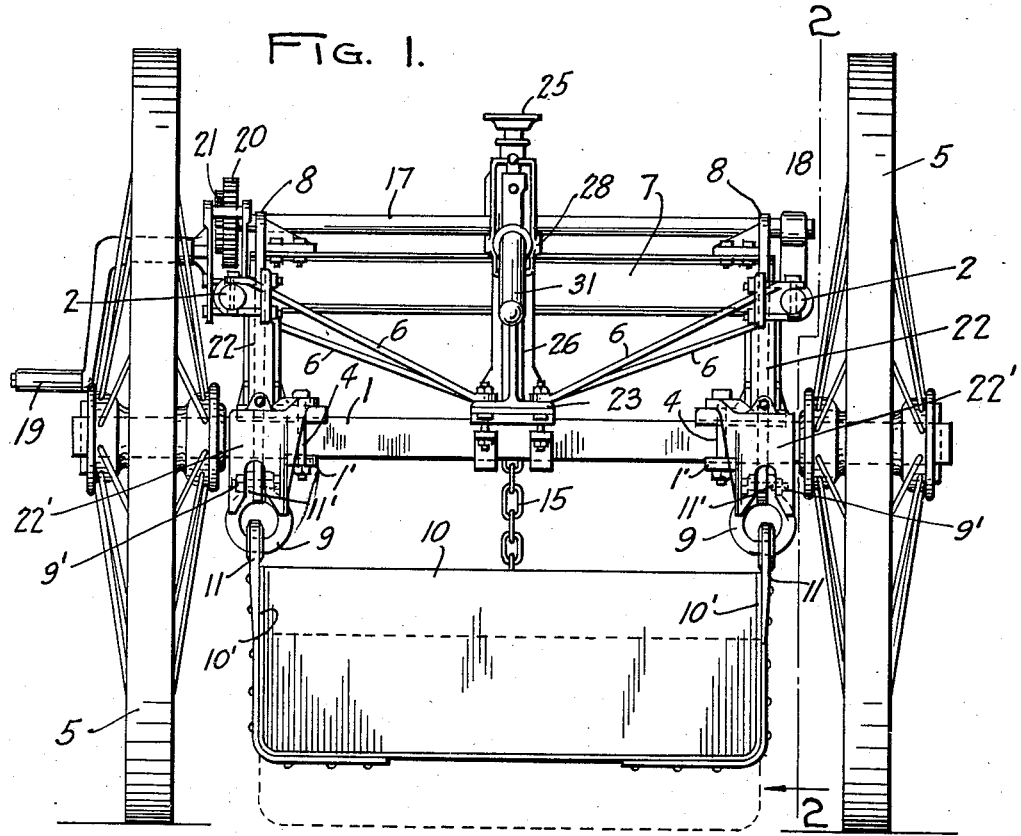
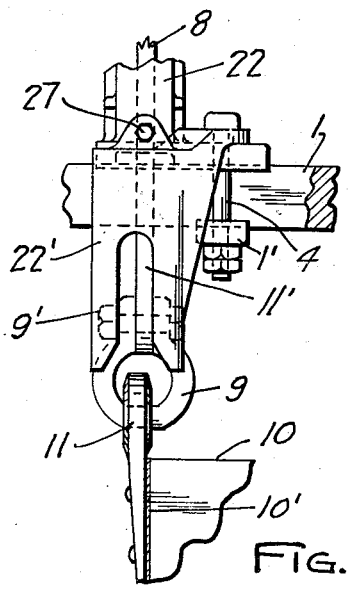
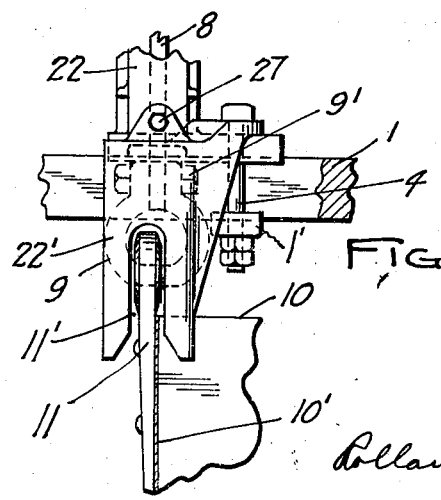

1,853,837

UNITED STATES PATENT OFFICE

ROLLAND S. TROTT, OF DENVER, COLORADO, ASSIGNOR TO RUBY KALBAUGH, OF GOLDEN, COLORADO; MARY K. WHITED, EXECUTRIX OF SAID RUBY KALBAUGH, DECEASED

STONE CART

Application filed June 13, 1930. Serial No. 460,892.

My invention relates to a cart for conveying rock, earth or other material.

The object of my invention is to provide such a cart which may be used to transport material at a low cost, and in localities where the ground to be traveled is rough and where considerable clearance may be required because of high centers due to rock that is either loose or in place, or due to other material or obstructions.

A further object is to provide such an equipment in which the skip or receptacle when loaded may be raised a considerable distance from the ground level, so as to provide exceptional ground clearance.

A further object is to provide such a cart, which because of its construction will permit little if any side sway of the skip or receptacle in spite of its high lift, while traversing rough places, so that the receptacle will never be able to strike and damage the wheels.

A further object is to provide such a conveyance especially adapted for use in quarries and providing skips or receptacles that can remain in position to be loaded separate from the truck, permitting the use of several skips or receptacles, some of which may be loaded while others of which are being moved, whereby the trucks may be kept in practically continuous active use, with no time being lost waiting for the skips or receptacles to be loaded.

Other objects and uses of the invention will appear hereinafter.

In the drawings:—

Figure 1 is a rear elevation of the car.

Figure 2 is a vertical section on the line 2—2 of Figure 1.

Figure 3 is a detail showing an eye, hook and guide.

Figure 4 is a detail showing an eye, hook and guide when raised to the upper limit for maximum road clearance.

Figure 5 is a detail of one form of shaft construction to be used in motor drawn equipment.

The parts of the cart may be designated as follows: truck axle 1; axle bars 1'; truss bars 3; bolts 4; wheels 5; truss or brace bars 6; top bar 7; vertical bars 8; eyes 9; eye bolts 9'; skip or receptacle 10; skip sides 10'; hooks 11; chain 15; chain hook 16; winding shaft 17; bearings 18; operating handle 19; operating handle shaft 19'; ratchet wheel 20; pawl 21; vertical bar guides 22; hook guides 22'; bracket 23; jack foot 24; jack sliding member 25; lifting jack 26; jack standard 28; jack ratchet teeth 29; jack operating lever 31; hook guide bolt 27; pawl means 32 and 33; release member 34; release dog 35 properly mounted and secured.

The jack 26 is upon the axle 1, which carries the wheels 5 properly mounted and the vertical bar guides 22, properly secured to the axle 1, and to which the shafts 2 are properly attached.

The vertical bars 8 are secured to the top bar 7 and are mounted for vertical movement in the vertical bar guides 22.

The foot 24 of the jack 26 contacts the lower face of the top bar 7, and acts to lift same, when the jack is operated by the lever 31.

The hook guides 22' are attached to the vertical bar guides 22 and the axle 1 by the bolts 4 and 27, and the axle bars 1'.

The eyes 9 are attached to the vertical bars by the bolts 9', and are spaced to receive the hooks 11 which are securely attached to the sides 10' of the skip 10.

When the skip is lifted by operation of the jack 26 the hooks 11 enter the guide slots 11' of the hook guides 22', and are thereby guided against side swing of the slip over rough roads.

By this construction not only is the skip permitted to rise till the hooks 11 are practically up against the under side of the axle 1, but in this high position it is the sides of the guide slots, and not the eyes 9, which act to prevent side swing of the skip 10. The eyes 9 must of necessity be made fairly large and wide so that too much time and care will not be required when backing the truck to engage the hooks 11 by the eyes 9. So the hook guides 22' and the slots 11' act to prevent side movement of the skip in spite of the loose fit of the hooks in the eyes.

When it is desired to disengage a skip from the truck, the release member 34 is moved about its pivot mounting on the operating lever 31 to engage the release dog 35 on the pawl 33. This acts to disengage both pawls 32 and 33 from the jack ratchet teeth 29 when the lever 31 is depressed and permits the skip 10 to drop to the ground.

The truck may then be moved forward to disengage the eyes 9 from the hooks 11, after the chain 15 is disengaged from the hook 16.

When it is desired to lift a skip, the eyes 9 are engaged with the hooks 11 of the skip 10 by properly backing the truck into place, the release member 34 is disengaged from the release dog 35, permitting the pawls 32 and 33 to again engage the ratchet teeth 29, and repeated movements of the lever 31 will then lift the skip to the desired height, with the hooks 11 positively positioned in the slots of the hook guides 22'.

The chain 15, attached to the winding shaft 17, is hooked upon the chain hook 16. The front end of the skip may then be raised slightly so the skip 10 will be level, and since the hooks 11 are positioned slightly to the rear of the center of the skip, this lifting of the front end by the chain 15 prevents teetering of the skip on the eyes 9, and steadies the skip so it is practically stationary with respect to the truck.

The handle 19 attached to the handle shaft 19' which is provided with the gear wheel 20' acts to revolve the winding shaft 17 through engagement between the gear 20' and the winding shaft gear 20.

The pawl 21, by engagement with the teeth of the gear 20 prevents the unwinding of the shaft 17 and holds the front end of the skip 10 at the level to which it is raised.

Before the skip is dropped by use of the release member 34 as described above, the operator by means of the handle 19 and by raising the pawl 21 may release the load on the chain 15 and remove it from the chain hook 16.

If the truck is to be drawn by a horse or a mule the shafts 2 are formed in the usual way for such construction. But, if the truck is to be motor or tractor drawn, the shafts 2 at their forward ends are formed for proper attachement in such cases, one such construction being shown in Figure 5.

In any case, the raising, steadying by the chain, and dropping of the skip will be done in the same way, and the hooks 11 will be positively positioned to hold the skip against side sway as described above.

Having now described my invention, what I claim as new, and desire to protect by Letters Patent is as follows:

1. A cart comprising a wheeled truck provided with vertically extending guide means, a rigid frame provided with means engaging in said guide means to guide said frame vertically on said truck, jack means for raising and lowering said frame, a receptacle open at the top and at the rear, mean for detachably supporting said receptacle on said vertically moving frame, means for supporting the forward end of said receptacle comprising a windlass and a chain connected to said windlass and having a releasable connection with the receptacle, and guide means carried by the truck and into engagement with which the receptacle may be raised by said jack, whereby side sway of the receptacle will be prevented.

2. In a wheeled cart having an axle, a frame having vertically extending means guided upon the axle, and jack means for raising and lowering the said frame, a receptacle open at the top and at the rear, and provided with hooks, means for detachably supporting said receptacle on said frame, and guide means supported upon the axle and adapted to receive and guide the said hooks, and prevent excessive lateral movement thereof.

3. In a wheeled cart having an axle, a receptacle open at the top and at the rear and provided with supporting hooks, means mounted on said axle, for detachably supporting and raising and lowering said receptacle, and guide means carried by the axle to receive and guide said hooks when the receptacle is raised, and thereby limit its lateral movement.

4. In a wheeled cart having an axle and provided with traction means attached to the axle, a receptacle open at the top and at the rear and provided with substantially vertical walls, means mounted on the said axle for detachably supporting and raising and lowering said receptacle, and guide means carried by the axle to receive and guide said walls, and thereby limit their lateral movement.

5. In a wheeled cart having an axle and provided with traction members attached to the axle, a receptacle open at the top and at the rear and provided with walls, support means mounted on the walls for supporting and guiding said receptacle, and means mounted on the said axle for detachably supporting and raising and lowering said receptacle, and guide means carried by the axle to receive and guide said support means against later movement.

6. In a wheeled cart having an axle and provided with traction members attached to the axle, a receptacle open at the top and at the rear and provided with walls, support means mounted on the walls for supporting and guiding said receptacle, and means mounted on the said axle for detachably supporting, steadying, raising and lowering said receptacle, and guide means carried by the axle to receive and guide said support means against later movement.

7. In a wheeled cart having an axle and provided with traction members attached to the axle, a receptacle open at the top and at the rear and provided with walls, support means mounted on the walls for supporting and guiding said receptacle, guide means carried by the axle to receive and guide said support means against lateral movement, and means mounted on said receptacle, comprising a windlass mounted on said traction members, a chain connected to said windlass and having a releasable connection with the receptacle, and jack means mounted on the axle and having a releasable connection with the receptacle.

In testimony whereof I affix my signature.

ROLLAND S. TROTT.